3,194,274
FLOATABLE HOSE

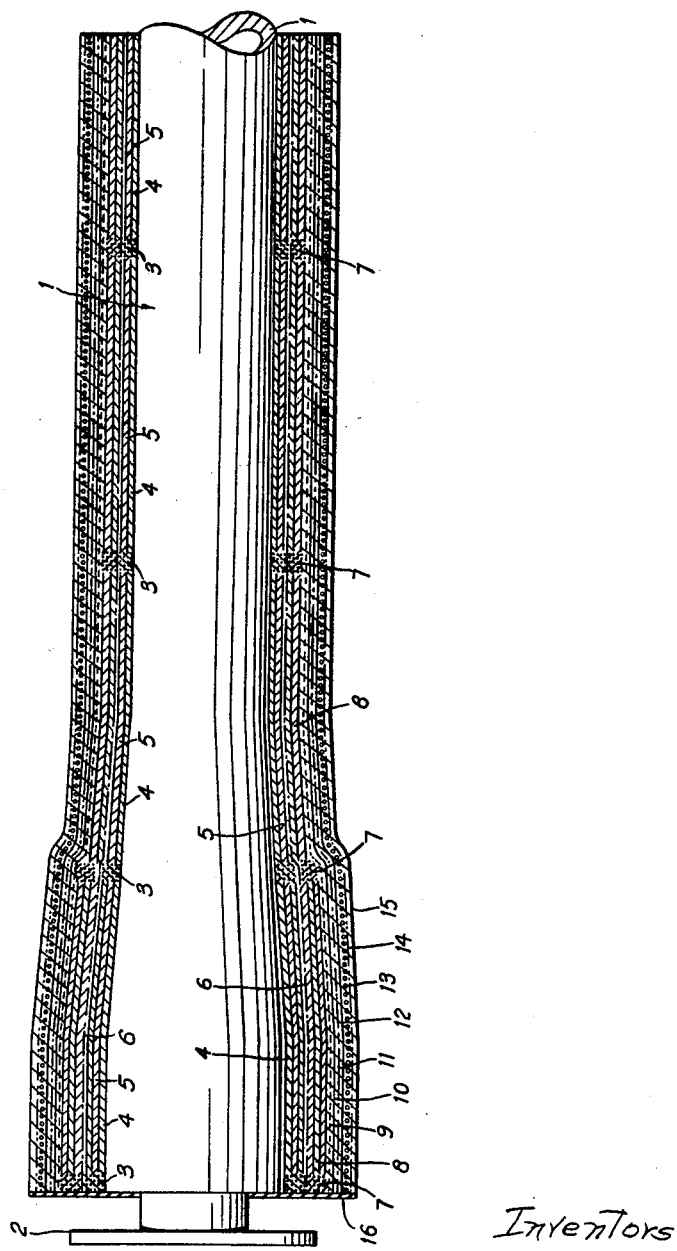

Arthur Archer Brian Griffiths, Firfwood, Manchester, and Donald Stuart Haughton, Romiley, England, assignors to Dunlop Rubber Company Limited, London, England, a British company
Filed May 14, 1963, Ser. No. 280,330
Claims priority, application Great Britain, May 22, 1962, 19,580/62
3 Claims. (Cl. 138—137)

This invention relates to floatable hose and especially to hose for the off-shore loading and discharge of oil.

A mooring buoy may be securely anchored in deep water and connected to a shore storage installation by a submarine pipeline and hose which is connected at the mooring buoy to buoyed hose for connection to manifolds amidships of an oil tanker moored at its bow to the mooring buoy.

An object of the invention is to provide floatable hose instead of relying on attached metal drums, which are corrodable and liable to damage and detachment, for buoying the hose connected at the mooring buoy.

According to the invention a floatable hose comprises a layer of flexible cellular material having an impervious covering and separated by impervious material into separate gas-containing compartments.

The invention includes a method of making floatable hose which comprises wrapping flexible cellular material around a hose bore construction and applying impervious material to form a cellular layer having separate gas-containing compartments, and applying an impervious covering.

The flexible cellular material usually has a closed cell formation and may be of an oil resistant synthetic rubber such as neoprene.

The cellular layer is preferably applied as a number of sections between impervious collars spaced longitudinally and extending around an inner hose bore construction and is usually applied in the form of two or more sub-layer wrappings separated by an impervious layer for example of rubber coated fabric which, together with the collars, separates the cellular wrapping into compartments longitudinally and radially of the hose.

The collars may be built up piece by piece, second annular pieces being added after the first cellular wrapping has been applied between first annular collar pieces.

The inner hose bore construction may be a conventional oil resistant hose fitted at each end with a coupling spigot and additional cellular wrapping may be provided at the end sections to provide additional buoyancy. The overall specific gravity of the hose should not be greater than unity so that the hose will float when filled with sea water.

The outer cellular wrapping is provided with an impervious protective covering, usually a flexible oil resistant material such as synthetic rubber or polyvinyl chloride, reinforced with a breaker fabric, and a cord winding may be incorporated.

One or more layers of a composition one of which includes a blowing agent such as dinitrosopentamethylenetetramine, may be provided beneath and next to the impervious covering. The pressure exerted by the expanding composition is of asssitance during vulcanizing an outer covering of vulcanizable rubber composition.

Usually the components employed in building up the flexible cellular layer, including the inner hose bore construction, are prevulcanized or set and rubber solution is applied to secure the components together, these being consolidated by pressure after each cellular wrapping has been applied. The outer covering and its reinforcement may be vulcanized by steam.

The bore diameter of hose required for loading or discharging oil from an oil tanker is generally from 10 to 16 inches and smaller hose, having a diameter of from 6 to 8 inches is employed for bunkering. A cellular layer some 2 inches in thickness, increased to 3 inches at the end of a section of hose adjacent the coupling by an additional wrapping, is usually sufficient to secure adequate buoyancy when steel couplings are used. With lighter types of coupling such as glass fibre, aluminum alloy etc. the additional wrapping may have less thickness.

The invention will be further described by way of example with reference to the accompanying drawing which shows a longitudinal section along one end of the covering layers of the floatable hose according to the invention, the various wrappings being shown in spaced apart relation for clarity.

A conventional oil resistant hose 1, made by assembling plies of synthetic rubber, fabric, and wire upon a mandrel, wrapping with cloth, curing on a steam vulcanizer and inserting a coupling spigot 2 at each end of the hose, was coated with synthetic rubber solution.

Collar pieces 3 were provided at intervals of 3 feet along the hose by winding strips of rubberized weftless cord fabric approximately 2 inches wide to a depth of 1 inch, the first and second annular collars at each end of the hose being built up to a depth of 1.5 inches.

Vulcanized closed cell neoprene sponge 4 of a density of about 12 pounds per cubic foot, having a thickness of 0.5 inch, a width equal to the space between each collar piece 3 and a length equal to the circumference of the inner hose construction was wrapped round between each collar piece. The exposed surface of the first cellular wrapping 4 was coated with a synthetic rubber solution and a second layer 5 of the neoprene sponge was applied between the collar pieces, further coating and wrapping being carried out between the collar pieces at each end of the hose, which was then wrapped tightly with dry cloth binders in order to consolidate the wrappings.

The binders were then removed and the exposed surface coated with synthetic rubber solution.

Vulcanized synthetic rubber coated nylon fabric 6, bias cut at 45° and then joined to form a continuous sheet of biassed fabric, was then wrapped around the assembly.

The surface of the rubber coated fabric was coated with synthetic rubber solution and a further outer set of collar pieces 7 was applied, in the same manner as before and immediately above the inner annular collar piece 3. The spaces between the further collar pieces were filled with vulcanized closed cell neoprene sponge wrappings 8 as previously described.

The surface of the outer cellular wrapping layer was then coated with synthetic rubber solution and the following vulcanizable oil resistant synthetic rubber composition 9 incorporating a blowing agent was applied to a thickness of 0.09 inches.

|  | Parts by weight |
|---|---|
| Neoprene GNA | 34 |
| Zinc oxide | 2 |
| Magnesia | 1 |
| Stearic acid | 0.5 |
| Antioxidant: Nonox D | 0.5 |
| F.E.F. black | 5 |
| M.T. black | 32 |
| Resin | 3 |
| Mineral oil | 9.5 |
| Factice | 10.5 |
| Blowing agent: dinitrosopentamethylene tetramine available as Vulcacel BN | 2 |
|  | 100 |

The assembly was then wrapped with dry cloth binders in order to consolidate the coated wrappings. After half an hour the binders were removed and the exposed surface freshened with toluol. A layer of unvulcanized neoprene composition 10 was then applied over the blowable composition to a thickness of 0.06 inch. The subsequent in situ expansion of the layer of composition 9 assisted in compressing the outer layer 10 during its subsequent vulcanization.

A cotton breaker fabric 11 having a weight of 25 ounces per square yard was spread on one side with unvulcanized neoprene composition topped to a thickness of 0.01 inch with the composition, on the other side and applied over the hose with the topped surface uppermost. A further layer of unvulcanized neoprene composition 12 was then applied to a thickness of 0.06 inch.

A core spun polyethylene terephthalate/cotton cord 13 was then wrapped helically over the assembly at a pitch of 0.05 inch and embedded in the underlying composition.

A further layer 14 of the above cotton breaker fabric was then applied with the topped surface against the cord and covered with a layer of unvulcanized neoprene composition 15 having a thickness of 0.14 inch.

The layers were then consolidated by wrapping with dry cloth binders, after removal of which each end of the hose assembly was trimmed an covered with an annulus 15 cut from a 0.19 inch thick sheet of unvulcanized neoprene composition.

The hose assembly was then wrapped with wet liner curing spurls and transferred to a steam vulcanizer. The steam pressure rose to 40 pounds per square inch in half an hour and was maintained at this pressure for a further hour. The hose was removed from the vulcanizer, the completed hose had an internal diameter of 6 inches and was 30 feet long. The outer diameter, between the thickened end sections, was 12 inches and the total weight was 975 pounds, corresponding to a specific gravity of 0.6.

Having described our invention what we claim is:

1. Floatable hose comprising an inner hose bore construction, a layer of flexible cellular oil resistant sythetic rubber materal surrounding said inner hose bore, separate gas-containing compartments in the layer defined by impervious collars spaced longitudinally along and extending around said inner hose bore. The collar being separated by sections of said flexible cellular material, and an impervious covering secured over said layer.

2. Floatable hose comprising an inner hose bore construction, a layer of flexible cellular oil resistant synthetic rubber material surrounding said hose bore, said layer having sub-layers constituting radially separated gas-containing compartments defined by annular impervious flexible material positioned between said sub-layers, and an impervious covering secured over said layer.

3. Floatable hose comprising an inner hose bore construction, a layer of flexible cellular oil resistant synthetic material surrounding said inner hose bore, said layer having sub-layers, radially and longitudinally separated gas-containing compartments in said layer defined by annular impervious flexible material positioned between said sub-layers and by collars spaced longitudinally along and extending around the inner hose bore, each collar comprising two annuli radially separated by said annular impervious flexible material, said collars being separated by sections of said flexible cellular material, and an impervious covering secured over said layer.

References Cited by the Examiner

UNITED STATES PATENTS

| | | |
|---|---|---|
| 1,877,793 | 9/32 | Beynon. |
| 2,421,625 | 6/47 | Kretschmer _____ 18—53 |
| 2,936,792 | 5/60 | MacCracken et al._____ 138—150 X |

FOREIGN PATENTS

| | | |
|---|---|---|
| 1,247,968 | 10/60 | France. |
| 683,547 | 11/39 | Germany. |
| 1,097,220 | 1/61 | Germany. |
| 850,421 | 10/60 | Great Britain. |

LAVERNE D. GEIGER, *Primary Examiner.*

EDWARD V. BENHAM, *Examiner.*